UNITED STATES PATENT OFFICE.

SAMUEL W. HEMPSTED, OF COLUMBUS, OHIO.

PAINT-OIL.

SPECIFICATION forming part of Letters Patent No. 288,433, dated November 13, 1883.

Application filed March 21, 1883. (No specimens.)

*To all whom it may concern:*

Be it known that I, SAMUEL W. HEMPSTED, of Columbus, in the county of Franklin and State of Ohio, have invented certain new and useful Improvements in Paint-Oils; and I do hereby declare the following to be a full, clear, and exact description of the invention, such as will enable others skilled in the art to which it pertains to make and use it.

My invention relates to an improvement in paint-oils; and it consists in the combination of drying-oil and rosin-oil for the purpose of forming an oil for mixing with paints of any kind, as will be more fully described hereinafter.

Where a quick drier is wanted, I take three parts rapid-drying oil and one part rosin-oil. Where a slow drier is wanted, I take two parts rapid-drying oil and one part rosin-oil. The rosin-oil is a lubricating-oil, and has no drying properties of its own, and is practically worthless as a paint-oil alone by itself. The rapid-drying oil, which is known as "rapid-drying oil," "paint-oil," "mixing-oil," "wooden-ware varnish," &c., is made from rosin treated with caustic potash to remove all acid, and then held in solution with benzine. This quick-drying oil by itself is absolutely worthless as a practical paint-oil, for the following reasons: First, it dries so rapidly as to make it extremely difficult to apply with a brush; second, it blisters at the slightest exposure to the sun or artificial heat; third, when exposed to wet, or even the slightest dampness or moisture, it will change any color of paint in which it is used alone to a streaky, milky whiteness. Where these two oils, which are comparatively worthless by themselves, are mixed together in certain relative proportions, the objectionable qualities of each are neutralized, and the two combined form an oil for painting purposes unexcelled by any other now known. When it is desired to thin this oil, or the paint with which it is mixed, benzine or boiled linseed-oil can be successfully used. By the mixture of these two aforementioned ingredients a paint-oil possessing the following points of excellence over any other oil is produced: First, it is much cheaper; second, rapid drying, with permanent results, and satisfactory; third, when used with ocher or other pigments as a priming-coat, this oil closes the pores of the surface to which it may be applied, acting as a filler, thereby preventing suction and saving largely in the amount of stock required for subsequent coats; fourth, when used on wet or dry lumber with Venetian red or any other color, two coats alone will produce a finished job—something that no paint-oil heretofore has been able to accomplish without the addition largely of japan or other high-priced materials; fifth, any paint mixed with this oil of mine can be thinned with benzine, gallon for gallon, without affecting or killing its life or brilliancy—a treatment linseed-oil or any other paint-oil will not stand, to my knowledge, which particular feature commends it for a large class of work—such as freight-cars and bridges—where the exposure of good painting must be reduced to a minimum.

Having thus described my invention, I claim—

A paint-oil composed of rapid-drying oil and rosin-oil, in or about the proportions specified.

In testimony whereof I affix my signature in presence of two witnesses.

SAMUEL W. HEMPSTED.

Witnesses:
J. F. HOFFMAN,
J. S. GOLD.